United States Patent
Wiercinski et al.

(10) Patent No.: US 11,571,638 B2
(45) Date of Patent: Feb. 7, 2023

(54) METHODS AND SYSTEMS FOR ENHANCED DISSOLVED GAS FLOATATION

(71) Applicant: Siemens Energy, Inc., Orlando, FL (US)

(72) Inventors: Shane P. Wiercinski, Wausau, WI (US); Curtis D. Cooley, Wausau, WI (US); Chad L. Felch, Kronenwetter, WI (US)

(73) Assignee: SIEMENS ENERGY, INC., Orlando, FL (US)

( * ) Notice: Subject to any disclaimer, the term of this patent is extended or adjusted under 35 U.S.C. 154(b) by 253 days.

(21) Appl. No.: 16/639,342

(22) PCT Filed: Aug. 13, 2018

(86) PCT No.: PCT/US2018/046431
§ 371 (c)(1),
(2) Date: Feb. 14, 2020

(87) PCT Pub. No.: WO2019/036328
PCT Pub. Date: Feb. 21, 2019

(65) Prior Publication Data
US 2021/0362075 A1 Nov. 25, 2021

Related U.S. Application Data

(60) Provisional application No. 62/545,713, filed on Aug. 15, 2017.

(51) Int. Cl.
*C02F 1/24* (2006.01)
*B01D 17/02* (2006.01)
(Continued)

(52) U.S. Cl.
CPC ......... *B01D 17/0205* (2013.01); *B01D 17/12* (2013.01); *B01D 21/0027* (2013.01);
(Continued)

(58) Field of Classification Search
CPC ... B01D 17/0205; B01D 17/12; B01F 3/0446; B01F 3/04588; B01F 2003/04659;
(Continued)

(56) References Cited

U.S. PATENT DOCUMENTS

| 3,479,017 A | 11/1969 | Thikotter et al. |
| 5,080,802 A * | 1/1992 | Cairo, Jr. ........... B01D 17/0205 |
| | | 210/703 |

(Continued)

FOREIGN PATENT DOCUMENTS

| BE | 815783 A | 9/1974 |
| CN | 1397379 A | 2/2003 |

(Continued)

OTHER PUBLICATIONS

PCT International Search Report and Written Opinion dated Oct. 9, 2018 corresponding to PCT Application No. PCT/US2018/046431 filed Aug. 13, 2018.

(Continued)

*Primary Examiner* — Christopher Upton

(57) ABSTRACT

There is disclosed processes and systems for improving the efficiency of the separation of insoluble contaminants from a fluid in a floatation unit.

18 Claims, 2 Drawing Sheets

(51) Int. Cl.
  *B01D 17/12* (2006.01)
  *B01D 21/00* (2006.01)
  *B01D 21/34* (2006.01)
  *C02F 1/00* (2006.01)
  *C02F 1/40* (2006.01)
  *B01F 23/232* (2022.01)
  *B01F 25/64* (2022.01)
  *B01F 23/233* (2022.01)
  *B03D 1/14* (2006.01)
  *B03D 1/24* (2006.01)
  *C02F 101/32* (2006.01)

(52) U.S. Cl.
  CPC ............ *B01D 21/34* (2013.01); *B01F 23/232* (2022.01); *B01F 23/2332* (2022.01); *B01F 23/2336* (2022.01); *B01F 23/23366* (2022.01); *B01F 23/23367* (2022.01); *B01F 25/64* (2022.01); *B03D 1/1431* (2013.01); *B03D 1/247* (2013.01); *C02F 1/008* (2013.01); *C02F 1/24* (2013.01); *C02F 1/40* (2013.01); *C02F 2101/32* (2013.01)

(58) Field of Classification Search
  CPC .. B01F 2003/04716; B01F 2003/04723; B01F 5/16; B01F 23/232; B01F 23/2332; B01F 23/2336; B01F 23/23366; B01F 23/23367; B01F 25/64; B03D 1/028; B03D 1/1431; B03D 1/247; C02F 1/24; C02F 1/40
  USPC .................................... 210/703, 221.1, 221.2
  See application file for complete search history.

(56) References Cited

U.S. PATENT DOCUMENTS

| | | | |
|---|---|---|---|
| 5,516,434 | A * | 5/1996 | Cairo, Jr. ............ B03D 1/1431 210/703 |
| 5,591,001 | A | 1/1997 | Ray et al. |
| 5,693,222 | A | 12/1997 | Galvan et al. |
| 6,337,023 | B1 | 1/2002 | Broussard, Sr. et al. |
| 7,157,007 | B2 * | 1/2007 | Frankiewicz ...... B01D 17/0205 210/703 |
| 9,115,006 | B2 * | 8/2015 | Gilmour ............... B03D 1/247 |
| 2008/0159061 | A1 | 7/2008 | Han |
| 2010/0264088 | A1 | 10/2010 | Yilikangas |
| 2013/0306568 | A1 | 11/2013 | Oklejas, Jr. |
| 2014/0116953 | A1 | 5/2014 | Blendinger et al. |
| 2015/0352504 | A1 | 12/2015 | Latva-Kokko et al. |
| 2016/0009571 | A1 | 1/2016 | Richerand, Sr. et al. |
| 2021/0362075 | A1 * | 11/2021 | Wiercinski ............ B03D 1/028 |

FOREIGN PATENT DOCUMENTS

| | | |
|---|---|---|
| CN | 101474541 A | 7/2009 |
| CN | 202683089 U | 1/2013 |
| CN | 105008032 A | 10/2015 |
| CN | 105148819 A | 12/2015 |
| GB | 1465801 A | 3/1977 |

OTHER PUBLICATIONS

Mu, Hongmei: "Floating sorting technology"; pp. 111-112; Beijing Institute of Technology Press; Jan. 31, 2015; ISBN: 978-7-5682-0016-5.

Qian, Yi: "Water pollution and its prevention"; p. 303; Chinese Culture Academy; Sep. 30, 1987.

* cited by examiner

METHODS AND SYSTEMS FOR ENHANCED DISSOLVED GAS FLOATATION

CROSS REFERENCE TO RELATED APPLICATIONS

This application claims priority to and the benefit of the filing date of U.S. Provisional Application No. 62/545,713, filed Aug. 15, 2017, the entirety of which is incorporated by reference herein.

FIELD

The present invention relates generally to fluid treatment systems and processes for removing insoluble substances from a fluid, such as produced water.

BACKGROUND

Water contaminated with small amounts of oil, suspended solids, and/or other insoluble substances is a byproduct of many industrial operations such as, for example, the production and refining of crude petroleum and natural gas; the manufacturing of chemicals, paint, textiles, paper and pulp; the generation of electricity; and the processing of metals, food and beverages. A major problem faced in these industrial operations is the economic separation of the oil, suspended solids, and/or other insoluble substances from the water so that the water can be reused or discharged into the environment.

This separation problem is especially prevalent in the offshore production of crude petroleum and natural gas, wherein oil and gas wells produce water or brine ("produced water") in conjunction with the oil and gas. The produced water is typically ladened with oil and other contaminants. Before the produced water can be reinjected into the well or disposed back into the sea, oil and other insoluble substances must be removed below acceptable limits. Accordingly, numerous methods and systems have been devised to reduce the content of insoluble substances from produced water derived from offshore oil and gas wells.

One method for separating oil and other insoluble substances from produced water is via the use of a floatation system, such as a gas floatation unit. Gas floatation units, for example, utilize gas bubbles (carried by a liquid medium) which are introduced into the fluid via low pressure (e.g., via an eductor) or under high pressure (e.g., within a pump). In theory, the bubbles are released from a delivery fluid into the fluid to be treated, attach to oil droplets and/or suspended solids, float them to the surface of the fluid where the gas is also released, and the oil and other insoluble substances are subsequently collected and separated from the fluid. One specific type of gas flotation unit is a dissolved gas floatation (DGF) unit. Exemplary dissolved gas flotation units/systems are disclosed in U.S. Pat. Nos. 3,452,869; 3,576,738; 3,725,264; and 4,022,695.

While various floatation systems have been developed over the years, floatation tanks of such systems typically require substantial volume and space to yield adequate separation results. Further, floatation systems which utilize the aforementioned dissolved gas may require several pumps in order to provide sufficient gas to produce bubbles for effective separation of the oil/insoluble substances from an associated fluid. Operating large floatation tanks and operating numerous pumps increases footprint, as well as equipment, material, and operating costs. Given a set volume of gas, those skilled in the art understand that a large population of small bubbles provide better contaminant removal than a smaller population of large bubbles. However, according to Stokes Law, smaller bubbles require a longer period of time (residence time e.g., tank size) to separate from the water phase than larger bubbles.

SUMMARY

In accordance with an aspect, there are provided processes and systems for the improved operation of a floatation unit (or any other process/system which utilizes dissolved gas bubbles). In one aspect, the processes and systems described herein optimize the separation of insoluble substances from a waste stream in a floatation unit by optimizing a bubble size in the fluid/gas mixture delivered to the floatation unit. For example, in a certain aspect, the processes and systems described herein substantially match an average bubble size of the bubbles dissolved in the fluid/gas mixture with an average oil droplet size. In a further embodiment, an average droplet size of insoluble solids in the waste stream is also considered in determining a desired average bubble size to be introduced into the floatation unit. Upon determination of the desired average bubble size, the systems and processes described herein may be adjusted to form a fluid/gas mixture having the desired average bubble size, such as by modifying operation of a pump as described below.

In accordance with another aspect, independently or in conjunction with optimizing the gas bubble size range in the fluid/gas mixture delivered to the floatation unit, aspects of the present invention also increase the amount of air drawn into a pump (relative to conventional methods) for generation and delivery of a fluid/gas mixture to the floatation unit. The increased air flow to the pump relative to conventional methods generally results in a greater gas bubble density in the fluid/gas mixture. In this way, the increased gas flow to the pump may reduce the size and number of pumps needed for the associated floatation system, and may also reduce the size of the vessel required for the separation process.

In accordance with another aspect, there is provided a separation process comprising:

dissolving an amount of gas in a fluid within a pump to form a fluid/gas mixture comprising a plurality of dissolved bubbles having an average bubble size of 100 micron or less;

delivering the fluid/gas mixture to a floatation unit comprising a waste stream therein, the waste stream comprising oil droplets having an average oil droplet size;

releasing the dissolved bubbles from the fluid/gas mixture; and separating the oil droplets from the waste stream in the floatation unit via attachment of the released bubbles to the oil droplets and rising of the oil droplets toward a fluid surface in the floatation unit.

In accordance with another aspect of the present invention, there is provided a separation process comprising:

dissolving an amount of a gas in a fluid within a pump to form a fluid/gas mixture comprising a plurality of dissolved bubbles;

during the dissolving, increasing an electrical frequency of the pump to increase a motor speed of the pump and increase an amount of the gas drawn into the pump, wherein the increased electrical is effective to provide an air bubble density in the fluid of at least about 9% by volume;

delivering the fluid/gas mixture from the pump to a floatation unit comprising a waste stream comprising an amount of oil droplets therein;

releasing the dissolved bubbles from the fluid/gas mixture; and separating the oil droplets from the waste stream in the floatation unit via attachment of the released bubbles to the oil droplets and rising of the oil droplets toward a fluid surface in the floatation unit.

In accordance with another aspect of the present invention, there is provided a separation system comprising:

a pump in fluid communication with a gas source and a fluid source, the pump configured to introduce the gas into the fluid to form a fluid/gas mixture, the fluid/gas mixture comprising a plurality of dissolved bubbles having an average bubble size of 100 micron or less; and a floatation unit comprising an amount of a waste stream having oil droplets of an average oil droplet size, the floatation unit comprising an inlet in fluid communication with the pump for receiving an amount of the fluid/gas mixture therein.

DETAILED DESCRIPTION

Figure 1:
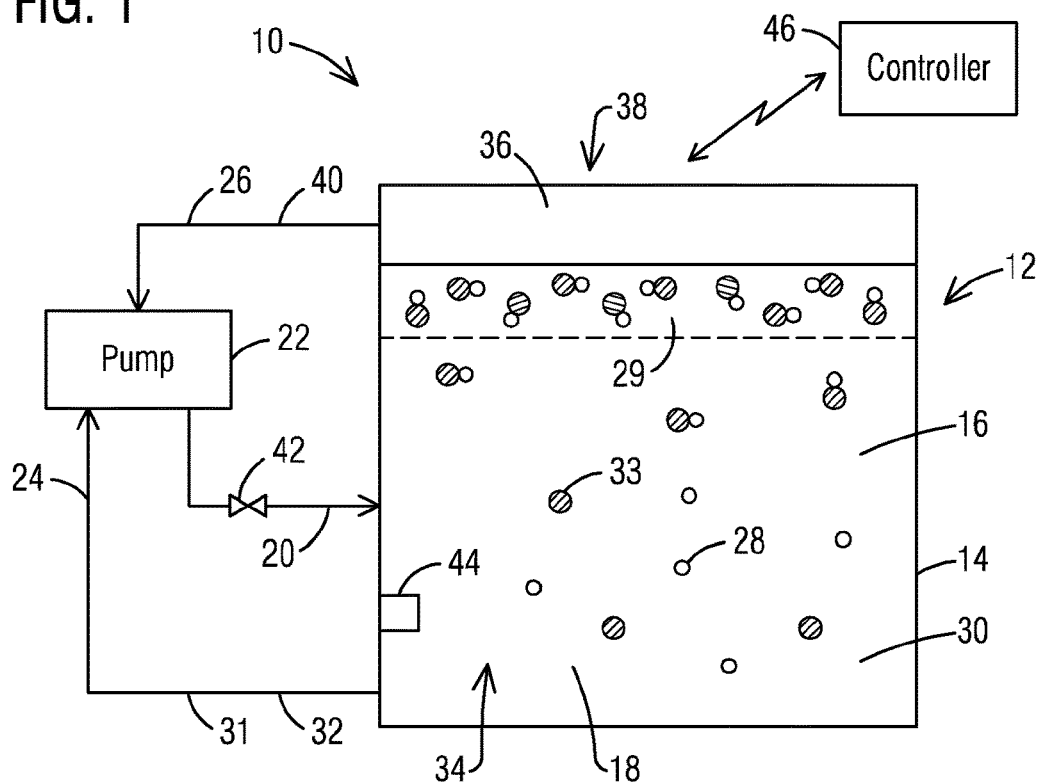
FIG. 1 illustrates a system for separating oil droplets from a fluid in accordance with an aspect of the present invention.

Now referring to the figures, FIG. 1 illustrates a system 10 comprising a flotation unit 12 in accordance with an aspect of the present invention. The flotation unit 12 comprises a vessel 14 having a cavity 16 having a volume sufficient to hold an amount of a fluid to be treated (hereinafter "waste stream 18" for ease of reference) and any other fluids therein. In certain embodiments, the waste stream 18 is delivered from a suitable waste source which delivers an amount of the waste stream 18 to one or more inlets of the vessel 14. The waste stream 18 may include any aqueous fluid having one or more insoluble contaminants therein, such as oils, solids, and other insoluble and/or suspended substances. In an embodiment, the waste stream 18 comprises produced water from an oil recovery process.

To deliver an amount of a fluid/gas mixture 20 to the vessel 14 to aid in the separation of oil/solid contaminants from the waste stream 18 in the vessel 14, there is provided a pump 22 in fluid communication with the vessel 14. The pump 22 comprises one more inlets to enable delivery of an aqueous fluid 24 thereto and one or more inlets to enable flow of a gas 26 thereto. As will be explained in detail below, the pump 22 is effective to mix the gas 26 with the fluid 24 in order to provide the fluid/gas mixture 20 comprising a plurality of gas bubbles dissolved therein. From the pump 22, the fluid/gas mixture 20 is delivered to the vessel 14. Within the vessel 14 or prior to delivery of the fluid/gas mixture 20 to the vessel 14 by the pump 22, the fluid/gas mixture 20 is subjected to a decrease in pressure which allows the dissolved gas bubbles to be released from the fluid/gas mixture 20. When the fluid/gas mixture 20 is combined with the waste stream 18 in the vessel 14, it appreciated that the total amount of fluid in the vessel 14 may be referred to collectively as "fluid 30." The released gas bubbles (shown as 28) rise toward a top surface of the fluid 30 in the vessel 14 with along with oil and optionally any further insoluble substances from the waste stream 18.

In certain embodiments, the insoluble substances may then be removed from a top portion 29 of the fluid 30 in the vessel 14 as shown in FIG. 1.

In an embodiment, the fluid 24 which is introduced to the pump 22 to provide the fluid/gas mixture 20 comprises a portion of a treated stream remaining in the vessel 14 after at least some oil is removed from the waste stream 18. This treated stream is shown as stream 32 and may also be referred to as "recycled stream 32" herein. To accomplish this, the system 10 may include a fluid recirculation line 31 to provide a pathway for delivery of the recycled stream 32 from the vessel 14 back to the pump 22. Thus, in an embodiment, the fluid 24 (within which air bubbles are dissolved) comprises a recycled stream 32. Typically, the treated (recycled) stream 32 is taken from or adjacent to a bottom portion 34 of the vessel 14 in order to provide as contaminant-free of a fluid as possible to the pump 22. In addition, due to the released gas bubbles, gas 36 may collect at or adjacent to an upper portion 38 of the vessel 14. In certain embodiments, the gas 26 may comprise the gas 36 collected at or adjacent to the upper portion 38 of the vessel 14. To deliver this gas 26 (e.g., gas 36) to the pump 22, the system 10 may include a gas recirculation line 40 to provide a pathway for delivery of the gas 36 from the vessel 14 back to the pump 22 to supply at least of a portion of the gas 26 to be dissolved in fluid 24 in the pump 22. In still other embodiments, an auxiliary aqueous fluid source and/or gas source may be provided to provide sufficient fluid 24 and gas 26 for the pump 22 to produce a desired amount of the fluid/gas mixture 20. In still other embodiments, the gas source may comprise an ambient source of air about the pump 22, wherein the pump 22 is configured to draw in at least a portion to all of the gas 26 to be dissolved in the fluid 24.

The floatation unit 12 may comprise any suitable apparatus known in the art which utilizes gas bubbles in the separation of insoluble contaminants from a fluid. In an embodiment, the floatation unit 12 comprises a vessel 14 or other housing for holding a quantity of liquid for separation of insoluble substances therefrom. In addition, the vessel 14 comprises one or more inlets for input of the fluid/gas mixture 20; one or more inputs for input of the waste stream 20 comprising insoluble contaminants; one more outlets for exit of the treated stream 32; one or more outlets for removal of the top portion 29; and/or one or more outlets for exit of the gas 36 from the floatation unit 12. In embodiment, the floatation unit 12 comprises a member selected from the group consisting of a dissolved gas floatation unit, a dissolved air floatation unit, and a dissolved nitrogen floatation unit as air known in the art. Further, the vessel 14 may also be of any suitable size, shape, and volume for its intended application.

The pump 22 provides the structure for introducing gas bubbles into the fluid 24 to dissolve the gas 26 in the fluid 24 in the form of bubbles in the system 10. The resulting fluid/gas mixture 20 is then introduced to the floatation unit 12 to aid in the separation of insoluble contaminants (e.g., oil and/or insoluble solids) from the waste stream 18 in the floatation unit 12. The pump 22 may be any suitable type of pump capable of dissolving an amount of a gas within a fluid introduced into the pump. In an embodiment, the pump 22 comprises a centrifugal pump as is well known in the art. Exemplary centrifugal pumps are set forth in U.S. Pat. Nos. 6,337,023 and 5,591,001, the entirety of which are incorporated by reference.

Figure 2:
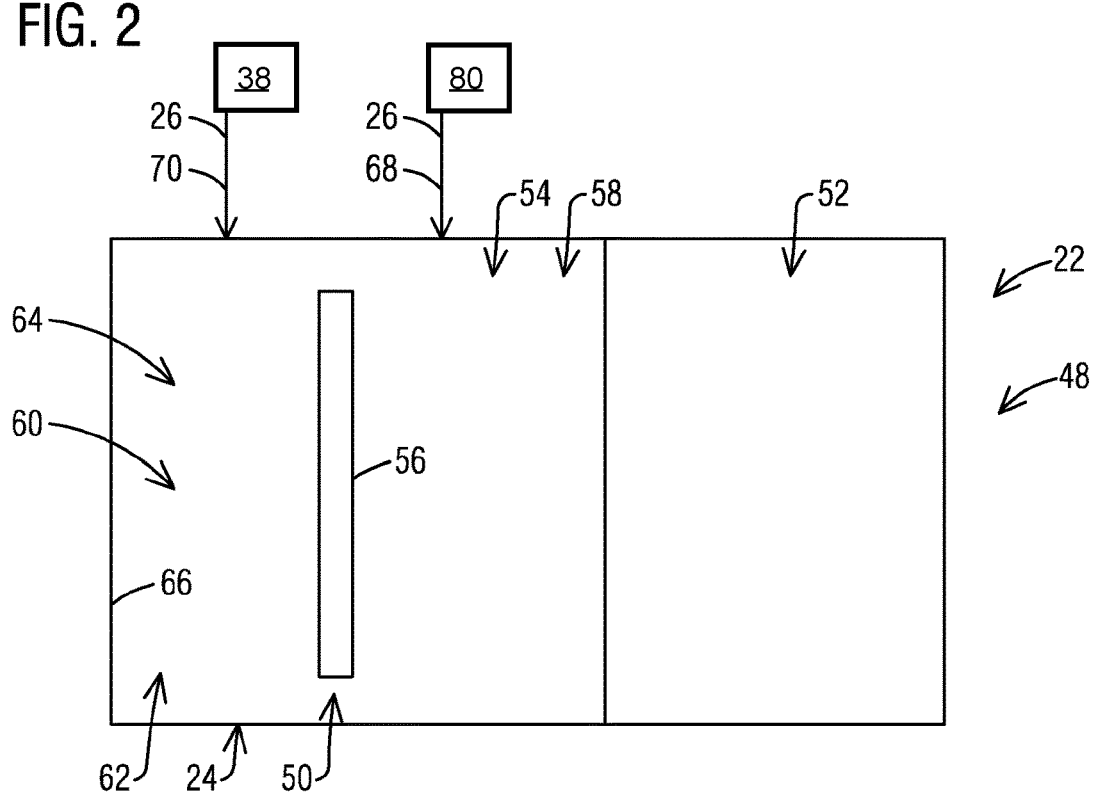
FIG. 2 illustrates a pump for use in the system in accordance with an aspect of the present invention.

In a particular embodiment and as shown in FIG. 2, the pump 22 comprises a centrifugal pump 48 comprising a front casing section 50 and a back casing section 52. The front casing section 50 comprises a first pump chamber 54. A rotatable impeller 56, having a front section 58 and a back section 60, is positioned within the first pump chamber 54 and produces, on rotation, movement of the liquid being pumped. Liquid enters the first pump chamber 54 through an intake and a pressurized liquid then exits the first pump chamber 54 through an outlet/discharge.

A seal chamber 62 is defined within the pump 22 between the back section 60 of the impeller 56 and an inner wall 66 of the pump 22. Typically, a gas 26 is introduced into the seal chamber 62 via a suitable gas line, such as gas recirculation line (gas line) 40 (FIG. 1). In an embodiment, a first end of the gas line 40 is connected to seal chamber 62 and the opposite end of the gas line 40 is connected to the upper portion 38 of the vessel 14 (floatation unit 12). In this way, a gas 26 may be delivered from the vessel 14 into the seal chamber 62 of the pump 22 to be combined under pressure with a fluid 24 introduced into the seal chamber 62. In other embodiments, all or an auxiliary amount of gas may be fed from a discrete gas source 80 (shown in FIG. 2). In any case, the pump is one effective to dissolve a quantity of gas bubbles having a desired average bubble size in the fluid 24 and generate the fluid/gas mixture 20. When the bubbles are released from the fluid/gas mixture 20, the "freed" gas bubbles in the fluid 30 in the vessel 14 help optimize the separation of the insoluble substances from the waste stream 18.

The bubbles dissolved within the fluid/gas mixture 20 by the pump 22 may be released therefrom by any suitable structure or process in the art such that the bubbles become "available" to aid in the removal of the insoluble contaminants in the waste stream 18. In certain embodiments, the system 10 may include a valve 42 (FIG. 1), orifice plate, or any other suitable structure positioned at or between an outlet of the pump 22 and an inlet to the vessel 14 which reduces pressure on the fluid/gas mixture 20, thereby reducing solubility of the gas bubbles and allowing their release within the fluid 30 in the vessel. In certain embodiments, a lower pressure in the vessel 14 may be sufficient to enable release of at least of portion of the gas bubbles from the fluid/gas mixture 20 in the vessel 14.

In accordance with an aspect of the present invention, the efficiency of a floatation system may be improved by operating the pump 22 to produce gas bubbles 30 having an average size of 100 micron or less. In this way, gas bubbles are produced which substantially match an average size of oil droplets 33 in the waste stream 18. In this way also, the bubble size for the system 10 may be controlled to optimize separation efficiency within the floatation unit 12. Specifically, the average bubble size is one that substantially matches an average oil droplet size in the waste stream 18 or in the fluid 30 in the vessel 14 (if different). In certain embodiments, by "substantially matches" it is meant that the average size of the gas bubbles 30 is controlled so as to be within 30%, and in another embodiment within 20%, of an average oil droplet and/or insoluble solids size in the waste stream 18 or the fluid 30 in the vessel 14. In still other embodiments, the average insoluble solid size may also be taken into consideration if different from the average oil droplet size. For example, in an embodiment, a desired average bubble size may be selected and provided which substantially matches an average size of the oil droplets 33 as described above and an average bubble size may be selected and provided (prior, concurrently, or following the providing of the gas bubbles for oil droplet removal) which substantially matches an average size of the insoluble solids in the waste stream 18.

By "average size or the like as used herein," it is understood to mean an average of a measured longest dimension of the substance(s) of interest. In an embodiment, the average gas bubble size is selected based upon the average oil droplet size of the waste stream 18 within the vessel 14. In other embodiments, the average oil droplet size is based upon a characterization of the waste stream 18 prior to delivery to the vessel 14 (in which case may be less diluted).

The average particle size of the oil droplets 33 and/or suspended solids may be determined by any suitable instrument or device configured to sense/detect particle size of the relevant material(s). In an embodiment, the instrument is one that utilizes laser diffraction to determine an average oil droplet and/or insoluble solids size in the waste stream 18 or in the fluid 30. The instrument(s) for particle size determination may be provided at any suitable location or locations in the system 10. An exemplary instrument (e.g., sensor 44) for determining oil droplet size, for example, is shown positioned in the vessel 14 as shown in FIG. 1.

In certain embodiments, an electronic controller (controller unit or control) 46 is provided in the system 10 which is in wired or wireless communication with selected components in the system 10 (e.g., sensors, valves, pumps, floatation unit). In an embodiment, the controller 46 is configured to directly or indirectly receive data from the one or more sensors 44, process the data in order to determine a desired average bubble size to be dissolved into the fluid 24 entering the pump 22, and generate one or more signals to selected components of the system (e.g., pump 22, valves, gas source, fluid source, and the like) in order to produce gas bubbles 30 of the desired size(s). The controller 46 is in electrical (wired or wireless) in communication with the necessary components in order to facilitate the amounts, concentrations, order, location of, and extent of the flow of any of the materials described herein. Further, the controller 46 comprises a general or special purpose computer programmed with or software/hardware to carry out its intended function(s) as described herein.

In a particular embodiment, the one or more sensors 44 are disposed within the flotation unit 12 or a pathway of the waste stream 18 and are configured to detect a parameter of the fluid 24 in the floatation unit 12 or of the waste stream 18 in the pathway. In addition, the controller 46 is in electrical communication with the one or more sensors 44 and the pump 22, wherein the controller 46 is configured to initiate a signal to the pump 22 to vary an amount of gas delivered to the pump 22 based upon an output (one or more of the detected parameters) of the one or more sensors 22. In an embodiment, the detected parameter is selected from the group consisting of oil droplet size, temperature, and salinity. When the parameter comprises an oil droplet size, for example, the operation of the pump 22 may be adjusted (e.g., gas flow increased or decreased) to provide gas bubbles 31 that more definitely match the average size of the oil droplets 31 (e.g., a bubble size within wherein the average bubble size is within 30 percent of the average oil droplet size). In other embodiments, a temperature or a salinity of the fluid 24 or waste stream 18 is measured via the one or more sensors 44. The controller 46 may then be programmed to determine the solubility of the gas 26 in the fluid 24 from the measures temperature and/or salinity. The amount of gas introduced into the pump 22 can then be controlled so as to be below the solubility limit of the gas 26 in the fluid 24 such that the volume of bubbles are maximized and the size thereof is in the desired range.

As used herein, the term "computer" may include a processor, a microcontroller, a microcomputer, a programmable logic controller (PLC), a discrete logic circuit, an application specific integrated circuit, or any suitable programmable circuit or controlling device. The memory may include a computer-readable medium or a storage device, e.g., floppy disk, a compact disc read only memory (CD-ROM), or the like. In an embodiment, the controller 46 executes computer readable instructions for performing any aspect of the methods or for controlling any aspect of the systems or process steps described herein. As such, the controller 46 may be configured to execute computer readable instructions to monitor and/or adjust parameters such as the flow rate of any of the gas or liquid flows into or out of the pump 22 and/or vessel 14.

Once the desired bubble size range has been determined, the formation of the fluid/gas mixture 20 with having the desired average bubble size dissolved therein may be accomplished via any suitable process. In certain embodiments, the desired fluid/gas mixture 20 may be produced by modifying one or more parameters of the pump or materials delivered thereto. For example, in an embodiment, the desired average bubble size may be achieved by modifying the amount and location of liquid (fluid 24) or gas (e.g., gas 26) intake into the pump 22.

In a particular embodiment, the pump 22 may include at least two gas inlets, and the volume of gas introduced into each inlet may affect the bubble size distribution dissolved into a corresponding fluid. Referring again to FIG. 2, the pump 22 may comprise an impeller 56 having a front section 58 and a back section 60. In an embodiment, a first amount of the gas 26 may be introduced into a first gas inlet 68 and delivered to a location in the front section 58 of the impeller 56 from the discrete source 80 while a second amount of the gas 26 is delivered to a second gas inlet 70 and to the back section 60 of the impeller 56 from the upper portion 38 of the vessel 14 as described above. In accordance with an aspect of the present invention, the inventors have found that delivering a predetermined amount of gas in front of the impeller 56 and a predetermined amount of gas in the back of the impeller 56 may have a direct effect on the size of the gas bubbles produced and dissolved into the fluid/gas mixture 20.

Figure 3:
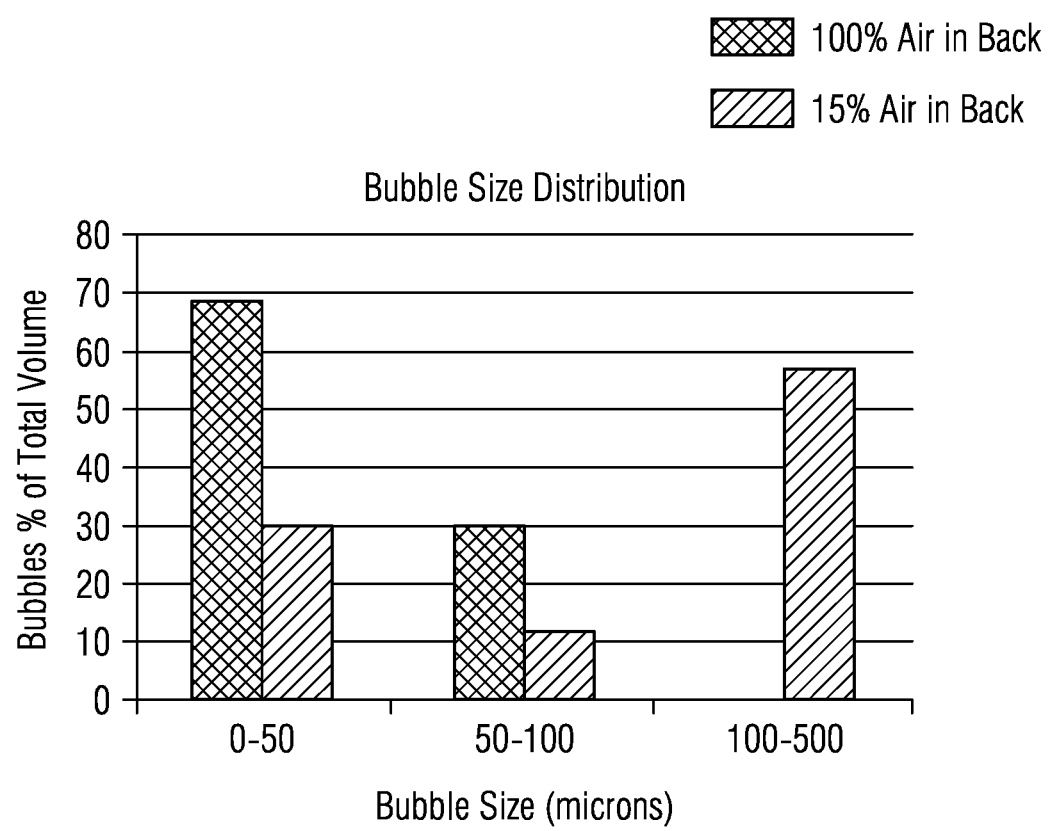
FIG. 3 illustrates the effect of gas intake between two inlets of the pump on bubble size in accordance with an aspect of the present invention.

By way of example, as shown in FIG. 3, with 100% by volume of the gas 26 being delivered/drawn to the back of the impeller, all (100%) of the produced bubbles were <100 microns and approximately 70% were less than 50 microns. In contrast, if only 15% of the total volume introduced to pump 22 is delivered to the back of the impeller and the remaining 85% by volume is delivered to the front of the impeller, approximately 57% of the bubbles were >100 microns (in contrast to 0% with all the gas delivered to the back of the impeller) and approximately 43% were >50 microns.

Thus, in one aspect, different (e.g., larger) average sized bubbles can be formed by distributing the gas in front and behind the impeller 56 in various ratios. It is further appreciated that the controller 46 described herein may be in electrical communication with corresponding control valves associated with the first and second inlets 68, 70 of the pump 22 in order to control an amount of gas flow to the pump 22 through the first and second inlets 68, 70, as well as the ratio of flows delivered to the first and second inlets 68, 70. As such, the above described process may generate a fluid/gas mixture 20 with a desired average bubble size via adjusting the operation of the pump 22. In some embodiments, the pump is adjusted so as to produce average sized bubbles which substantially match an average size of oil droplets 33 (and/or optionally suspended solids) in the waste stream 18 and/or within the floatation unit 12 (e.g., vessel 14).

In accordance with another aspect of the present invention, the inventors have found that increasing the frequency (Hz) of the pump 22 may allow for an increase in a gas volume delivered to the pump 22 without the cavitation or gas lock issues associated with conventional pumps. To provide sufficient air/dissolved bubbles in a gas floatation system to aid in insoluble substance removal, a plurality of pumps or large volume floatation units 12/vessels 14 are typically provided. One reason for multiple pumps is conventional practice has deterred the increase of gas delivery to any individual pump beyond a certain level since cavitation and gas lock tend were found to occur (during pump operation) above certain levels. For example, it has been found that when the gas intake volume is about 9% by volume of the fluid (fluid 24) intake volume, the likelihood of cavitation and gas lock substantially increases. The present inventors, however, have surprisingly found that increasing the frequency of the pump 22 to at least 70 Hz resulted in more gas being drawn into the pump 22 without the negative cavitation/gas lock effects associated with conventional methods.

In an embodiment, the operation of the pump 22 at the higher frequency (70 Hz or more) results in the increased speed of the motor (an rpm increase in the motor), which thereby increases the amount of gas 26 drawn into the pump. In certain embodiments, the gas 26 is drawn into at least two gas inputs (e.g., inputs 68, 70) of the pump 22 at the higher 70 Hz) frequency to generate a greater air bubble volume/density relative to conventional methods or pumps (conventional pumps operating at 60 Hz or less). Advantageously, the increased gas (air bubble) volume in the fluid/gas mixture as a result of operating at the higher Hz reduces the need for multiple pumps or a large vessel as in conventional floatation/separation processes. In certain embodiments, operating at the higher 70 Hz) frequency is effective to provide an air bubble density in the fluid 24 of at least about 9% by volume. Further, in certain embodiments, the pump 22 may comprise a variable frequency pump as is known in the art. Use of a variable frequency pump allows one to adjust the frequency to multiple set points. A higher frequency will result in higher impeller speeds, and thus more air drawn into the pump 22. This amount of gas 26 provided in front of/back of the impeller can be controlled to deliver a desired average bubble size to the fluid 24.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including," "comprising," "involving," "having," "containing," "characterized by," "characterized in that," and variations thereof herein is meant to encompass the items listed thereafter, equivalents thereof, as well as alternate embodiments consisting of the items listed thereafter exclusively. Use of ordinal terms such as "first," "second," "third," and the like in the claims to modify a claim element does not by itself connote any priority. The use of singular and plural terms is not intended to be limiting. When an article or material is described in the singular, for example, it shall be understood that by "a" it is meant "one or more" of such articles or materials. Similarly, when an article or material is described in the plural, it shall be understood that such description includes a single one of the same article or material.

While exemplary embodiments of the disclosure have been disclosed many modifications, additions, and deletions may be made therein without departing from the spirit and scope of the disclosure and its equivalents, as set forth in the following claims. Those skilled in the art would readily appreciate that the various parameters and configurations described herein are meant to be exemplary and that actual parameters and configurations will depend upon the specific application for which the systems and methods directed toward separation treatment processes using composite media of the present disclosure are used. Those skilled in the art will recognize, or be able to ascertain using no more than routine experimentation, many equivalents to the specific embodiments described herein.

What is claimed is:

1. A separation process comprising:
    dissolving an amount of gas (26) in a fluid (24) via a pump (22) having an impeller (56) to form a fluid/gas mixture (20) comprising a plurality of dissolved bubbles (28) having an average bubble size of 100 micron or less;
    delivering the fluid/gas mixture (20) to a floatation unit (12) comprising a waste stream (18) therein, the waste stream (18) comprising oil droplets (33) having an average oil droplet size;
    releasing the dissolved bubbles (28) from the fluid/gas mixture; and
    separating the oil droplets from the waste stream (18) in the floatation unit (12) via attachment of the released bubbles (28) to the oil droplets (33) and rising of the oil droplets (33) toward a fluid surface in the floatation unit (12);
    introducing a first amount of gas (28) to a front section (58) of the impeller (56), the first amount of gas being fed from a discrete gas source;
    introducing a second amount of gas to a back section (60) of the impeller (56), the second amount of gas drawn directly from the floatation unit; and
    modifying a ratio of the first amount of gas to the second amount of gas to change the average bubble size.

2. The process of claim 1, wherein the average bubble size is within 30 percent of the average oil droplet size.

3. The process of claim 1, wherein the average bubble size is within 20 percent of the average oil droplet size.

4. The process of claim 1, further comprising:
    determining the average size of the oil droplets (33) in the floatation unit (12) or the waste stream (18); and
    adjusting the average bubble size via the pump (22) based on the determined average bubble size.

5. The process of claim 1, further comprising operating the pump (22) at frequency of at least 70 Hz in order to increase a motor speed of the pump (22) and increase an amount of air drawn into the pump (22) relative to a pump operating at 60 Hz or less.

6. The process of claim 1, further comprising:
    determining an average size of solid contaminants in the floatation unit (12) or waste stream (18); and
    adjusting the average bubble size via the pump (22) based on the determined average solid contaminant size.

7. The process of claim 1, further comprising delivering a treated stream (32) from the floatation unit (12) to the pump (22) to provide the fluid (24) for the pump (22), the treated stream (32) having a reduced amount of oil relative to the waste stream.

8. The process of claim 1, further comprising delivering an amount of gas from a top portion (29) of the floatation unit (12) to the pump (22) to provide the gas for the dissolving.

9. A separation system (10) comprising:
    a pump (22) in fluid communication with a gas source and a fluid source, the gas source and the fluid source configured to deliver a gas (26) and a fluid (24), respectively, to the pump (22), the pump (22) comprising:
        a housing that defines a first chamber (54);
        an impeller (56) disposed within the first chamber (54) and defining a front section (58) in front of the impeller (56) and a back section (60) behind the impeller (56); and
        a first gas inlet (68) associated with the front section (58) in front of the impeller (56) and a second gas inlet (70) associated with the back section (60) behind the impeller (56), the first inlet and the second inlet formed in the housing;
    the pump configured to introduce the gas (26) into the fluid (24) to form a fluid/gas mixture (20), the fluid/gas mixture (20) comprising a plurality of dissolved bubbles (28) having an average bubble size of 100 micron or less; and
    a floatation unit (12) comprising an amount of a waste stream having oil droplets (33) of an average oil droplet size, the floatation unit (12) comprising an inlet in fluid communication with the pump (22) for receiving an amount of the fluid/gas mixture (24) therein, wherein the average bubble size is dependent on a ratio of the gas (26) introduced into the first gas inlet (68) and the second gas inlet (70); and
    wherein the controller (46) is configured to regulate the ratio of gas (22) introduced to the first gas inlet (68) and the second gas inlet (70).

10. The system (10) of claim 9, wherein the average bubble size is within 30 percent of the average oil droplet size.

11. The system (10) of claim 9, wherein the average bubble size is within 20 percent of the average oil droplet size.

12. The system (10) of claim 9, further comprising:
    one or more sensors (44) disposed in the floatation unit or a pathway of the waste stream (18), the one or more sensors (22) configured to detect a parameter of the fluid (24) in the floatation unit (12) or of the waste stream (18) in the pathway; and
    a controller (46) in electrical communication with the one or more sensors (44) and the pump (22), the controller (46) configured to initiate a signal to the pump (22) to vary an amount of gas (26) delivered to the pump (24) based upon an output of the one or more sensors (22).

13. The system (10) of claim 12, wherein the detected parameter is selected from the group consisting of oil droplet size, temperature, and salinity.

14. The system of claim 9, further comprising a fluid line (31) extending between an outlet at a bottom portion (34) of the floatation unit and an inlet of the pump (22).

15. The system of claim 9, further comprising a gas line (40) extending between an outlet at a top portion of the floatation unit (12) and an inlet of the pump (22).

16. The system of claim 9, wherein the pump (22) is configured to operate at a frequency of 70 Hz or more.

17. A separation process comprising:
    dissolving an amount of a gas (26) in a fluid (24) within a pump (22) to form a fluid/gas mixture (20) comprising a plurality of dissolved bubbles (28), dissolving including introducing a first amount of gas into the pump from a floatation unit via a first gas inlet and introducing a second amount of gas from a discrete gas source into the pump via a second gas inlet;

modifying a ratio of the first amount of gas to the second amount of gas to change an average bubble size;

during the dissolving, increasing an electrical frequency of the pump (22) to increase a motor speed of the pump (22) and increase an amount of the gas (26) drawn into the pump (22), wherein the increased electrical is effective to provide an air bubble density in the fluid (24) of at least about 9% by volume;

delivering the fluid/gas mixture (20) from the pump to the floatation unit (12) comprising a waste stream (18) comprising an amount of oil droplets (33) therein;

releasing the dissolved bubbles (28) from the fluid/gas mixture (20); and separating the oil droplets (33) from the waste stream (24) in the floatation unit (20) via attachment of the released bubbles (28) to the oil droplets and rising of the oil droplets (33) toward a fluid surface in the floatation unit (12).

18. The separation process of claim 17, wherein the electrical frequency is least 70 Hz.

* * * * *